Patented May 30, 1944

2,349,945

UNITED STATES PATENT OFFICE 2,349,945

WELDING ROD

Louis C. Dodd, Buffalo, N. Y., assignor to Magnus Metal Corporation, Chicago, Ill., a corporation of New York No Drawing. Original application April 2, 1941, Serial No. 386,432, now Patent No. 2,319,539, dated May 18, 1943. Divided and this application May 13, 1943, Serial No. 486,912

3 Claims. (Cl. 219—8)

This invention relates in general to alloys and more particularly to an alloy adapted for use as a welding rod.

A principal object of the invention is the provision of a welding rod which is composed of an alloy having anti-friction qualities which adapt it for use in conjunction with bearing surfaces. The present application is a division of my application Serial No. 386,432, filed April 2, 1941, now Patent No. 2,319,539, dated May 18, 1943.

A specific instance of use for such welding rods is in the building up of lateral wearing surfaces of engine truck, trailers and driving boxes. Lateral metal welded to the boxes has a stronger bond and is more resistant to cracking than metal applied by other means.

It is known that worn parts have been reconditioned by depositing weld metal thereon by any suitable process, and thereafter machining it to the desired size and shape. However, it has been found that the known metals which are suitable for welding, are difficult to machine, particularly after being subjected to the welding operation. Furthermore, such weld metal has been found to be inferior for bearing metals because of a tendency to "grab or seize."

To overcome these difficulties, lead in varying quantity has been incorporated in welding rods, since such a rod has been found to be easily machined, and in addition, acts to prevent "grab or seize," presumably because of the inherent lubricating properties of lead. In such rods, tin in substantial amount has been employed as a hardener.

The use of tin in amounts above 10.0% has been found to cause excessive wear of the adjacent parts, such as the hubs of the wheels, due to the hardness of the alloy used in the known weld rods. The known welding rods, in which substantial amounts of tin are embodied, have a high Brinell hardness, which has resulted in thermo cracks in the welded area. Furthermore, because of this hardness, excessive wear of the adjacent parts has resulted.

I have found that nickel incorporated in such an alloy not merely serves as a hardening agent, but keeps the lead in suspension, so as to enable the use of lead in greater amounts than has been possible heretofore. Accordingly, my invention contemplates the production of a welding rod having nickel as one of its components.

I have also found that relatively small amounts of zinc, with or without nickel, improves the physical properties of the alloy by increasing the uniformity of the alloy. Accordingly, my invention contemplates the production of a welding rod having nickel and/or zinc among its components. Zinc has no effect upon the hardness of the alloy, unless it is used in high amounts, in which case it reduces the uniformity of the alloy, in connection with the use of high lead.

The inclusion of phosphorus in limited amounts is contemplated when a welding rod is desired for certain conditions of use. I have found it of particular benefit or advantage when the carbon arc process is employed in building up the metal part, since the phosphorus increases the fluidity of the alloy.

The metal part is built up with any of the rods herein described by depositing the desired rod on such metal part by using the carbon-arc or metallic arc process. Since nickel does not volatilize when either process is employed, the nickel-tin-lead rod above mentioned may be used with either process. However, zinc and lead will volatilize to a certain extent when either are incorporated in the alloy in relatively large amounts, when the rod is deposited on a metallic part by either the carbon-arc or the metallic-arc process, and accordingly the metallic-arc process is preferably employed when rods including these elements in relatively large amounts are used.

Specifically my invention comprises an alloy, for use in welding rods having substantially the following composition within the limits indicated.

| | Per cent |
|---|---|
| Lead | 0.10–20.0 |
| Nickel | 0.10– 6.0 |
| Copper | Balance |

Traces of elements other than those specified in the mixture are usually found as impurities in commercial metal. The total of the impurities should be limited to 0.20% maximum.

A welding rod that has been found to give very satisfactory results is made up from an alloy containing:

| | Per cent |
|---|---|
| Lead | 15.0 |
| Nickel | 5.5 |
| Copper | Balance |

Another welding rod that will give satisfactory results is made up from an alloy in which tin is incorporated in the nickel-lead alloy herein described. In such an alloy, the amount of tin preferred is about 6.0%, the preferred amount of nickel is 0.50%, and the preferred amount of lead is 20.0%, but these amounts may be varied within the limits indicated:

| | Per cent |
|---|---|
| Lead | 0.10–20.0 |
| Nickel | 0.10– 1.0 |
| Tin | 1.0 – 8.0 |
| Copper | Balance |

If desired, other alloys may be used in the rod. Such an alloy would contain, in a copper base, zinc, tin and lead, preferably in the amounts of zinc 2.0%, tin 6.5%, lead 15.0%, but these amounts may be varied within the following limits:

| | Per cent |
|---|---|
| Zinc | 0.1–10.0 |
| Tin | 1.0–10.0 |
| Lead | 1.0–20.0 |
| Copper | Balance |

Since zinc has no affect upon the hardness of the alloy, it may be used in relatively high amounts. However, since it reduces the uniformity of the alloy when used in high amounts and particularly with high lead, I prefer that it be incorporated in lower amounts.

Another satisfactory rod, includes nickel in the foregoing alloy, within the limits here given.

| | Per cent |
|---|---|
| Zinc | 0.1–10.0 |
| Tin | 1.0–10.0 |
| Lead | 1.0–20.0 |
| Nickel | 0.1– 1.0 |
| Copper | Balance |

However, I prefer to use a rod containing:

| | Per cent |
|---|---|
| Zinc | 2.0 |
| Tin | 6.5 |
| Lead | 15.0 |
| Nickel | 0.5 |
| Copper | Balance |

When phosphorus is desired in any of the alloys herein described, it may be included in the desired alloy within a range of 0.01% to 1.0%, but I prefer to use 0.25%.

The weld rods are cast in a chill mold and work particularly satisfactorily when applied to the backing metal by electric welding.

It is thought that the invention and many of its attendant advantages will be understood from the foregoing description, and it will be apparent that various modifications may be made in the composition of metals and their percentages without departing from the spirit and scope of the invention or sacrificing all of its material advantages, the compositions hereinbefore described being merely preferred embodiments thereof.

I claim:

1. A welding rod consisting predominantly of copper and containing tin from 1.0 to 8.0%, nickel 0.1 to 1.0%, and lead from 3.0 to 20.0%.

2. A welding rod consisting of an alloy comprising lead 15.0%, nickel 1.0%, tin 3.50%, and the balance copper.

3. A welding rod, comprising an alloy containing lead 20.0%, nickel 0.50%, tin 6.0%, and the balance copper.

LOUIS C. DODD.